United States Patent
Yamane

(10) Patent No.: US 10,792,743 B2
(45) Date of Patent: Oct. 6, 2020

(54) WIRE ELECTRICAL DISCHARGE MACHINE

(71) Applicant: FANUC CORPORATION, Yamanashi (JP)

(72) Inventor: Hikaru Yamane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 402 days.

(21) Appl. No.: 15/690,424

(22) Filed: Aug. 30, 2017

(65) Prior Publication Data
US 2018/0056418 A1 Mar. 1, 2018

(30) Foreign Application Priority Data

Aug. 31, 2016 (JP) ................................. 2016-169820

(51) Int. Cl.
| | | |
|---|---|---|
| *B23H 1/02* | (2006.01) | |
| *B23H 3/02* | (2006.01) | |
| *B23H 7/10* | (2006.01) | |
| *B23H 7/20* | (2006.01) | |

(52) U.S. Cl.
CPC .............. *B23H 1/024* (2013.01); *B23H 3/02* (2013.01); *B23H 7/102* (2013.01); *B23H 7/20* (2013.01); *B23H 2500/20* (2013.01); *B23H 2600/10* (2013.01)

(58) Field of Classification Search
CPC .......... B23H 1/024; B23H 3/02; B23H 7/102; B23H 7/20; B23H 2500/20; B23H 2600/10
See application file for complete search history.

(56) References Cited

U.S. PATENT DOCUMENTS 5,338,912 A  * 8/1994  Iwasaki .................... B23H 7/10
                                                        219/69.12
5,753,880 A  * 5/1998  Kajitori .................. B23H 7/102
                                                        219/69.12
2003/0010753 A1  1/2003  Yamada et al.
(Continued)

FOREIGN PATENT DOCUMENTS

EP          0664177 A1      7/1995
EP          0664179 A1      7/1995
(Continued)

OTHER PUBLICATIONS

Extended European Search Report (EESR) issued in EP Application No. 17001461.7, dated Feb. 6, 2018, 8 pages.
(Continued)

*Primary Examiner* — Brian W Jennison
(74) *Attorney, Agent, or Firm* — Hauptman Ham, LLP

(57) ABSTRACT

A wire electrical discharge machine includes: a travelling route formed of multiple divisional regions, through which a wire electrode is fed by an auto wire feeding mechanism; and a memory storing failure evaluation reference data on the auto wire feeding for every divisional region. The wire electrical discharge machine detects failure of the auto wire feeding and locate the tip position of the wire electrode at the time of failure and causes a controller to determine whether to perform or stop retry of the auto wire feeding based on the located tip position and the failure evaluation reference data for every divisional region.

7 Claims, 6 Drawing Sheets

(56) References Cited

U.S. PATENT DOCUMENTS

2012/0305530 A1\* 12/2012 Inaba .................. B23H 7/102
219/69.12
2013/0161292 A1\* 6/2013 Inaba .................. B23H 7/102
219/69.11

FOREIGN PATENT DOCUMENTS

| JP | 58-177234 A | 10/1983 |
| JP | 2-160422 A | 6/1990 |
| JP | 7-24644 A | 1/1995 |
| JP | 7-112328 A | 5/1995 |
| JP | 3882751 B2 | 2/2007 |
| JP | 2010-162631 A | 7/2010 |
| JP | 2013-129048 A | 7/2013 |

OTHER PUBLICATIONS

Office Action issued in corresponding European Application No. 17 001 461.7, dated Mar. 17, 2020; 5 pgs.

\* cited by examiner

FIG. 4A

| FAILURE EVALUATION REFERENCE DATA | DIVISIONAL REGION | A1 | A2 | A3 | A4 | A5 | A6 | A7 | A8 | A9 | A10 |
|---|---|---|---|---|---|---|---|---|---|---|---|
| | DIFFICULTY LEVEL | 1 | 5 | 8 | 6 | 3 | 3 | 3 | 1 | 1 | 1 |

| ACTUAL FAILURE COUNT | DIVISIONAL REGION | A1 | A2 | A3 | A4 |
|---|---|---|---|---|---|
| | FAILURE COUNT | 0 | 6 | 12 | 3 |

| TOTAL OF FAILURE COUNTS IN PRIOR ART |
|---|
| 21 |

FIG. 4C

| CALCUATED FAILURE EVAUATION VALUE | DIVISIONAL REGION | A1 | A2 | A3 | A4 |
|---|---|---|---|---|---|
| | | 0 | 1.2 | 1.5 | 0.5 |

FAILURE EVALUATION VALUE

Ev

| TOTAL OF FALURE EVALUATION VALUES |
|---|
| 3.2 |

FIG. 5A

| FAILURE EVALUATION REFERENCE DATA | DIVISIONAL REGION | A1 | A2 | A3 | A4 | A5 | A6 | A7 | A8 | A9 | A10 |
|---|---|---|---|---|---|---|---|---|---|---|---|
| | UPPER LIMIT VALUE | 1 | 10 | 15 | 10 | 2 | 2 | 2 | 1 | 1 | 1 |

| ACTUAL FAILURE COUNT | DIVISIONAL REGION | A1 | A2 | A3 | A4 |
|---|---|---|---|---|---|
| | FAILURE COUNT | 0 | 6 | 12 | 3 |
| | FAILURE FLAG | 0 | 0 | 0 | 0 |

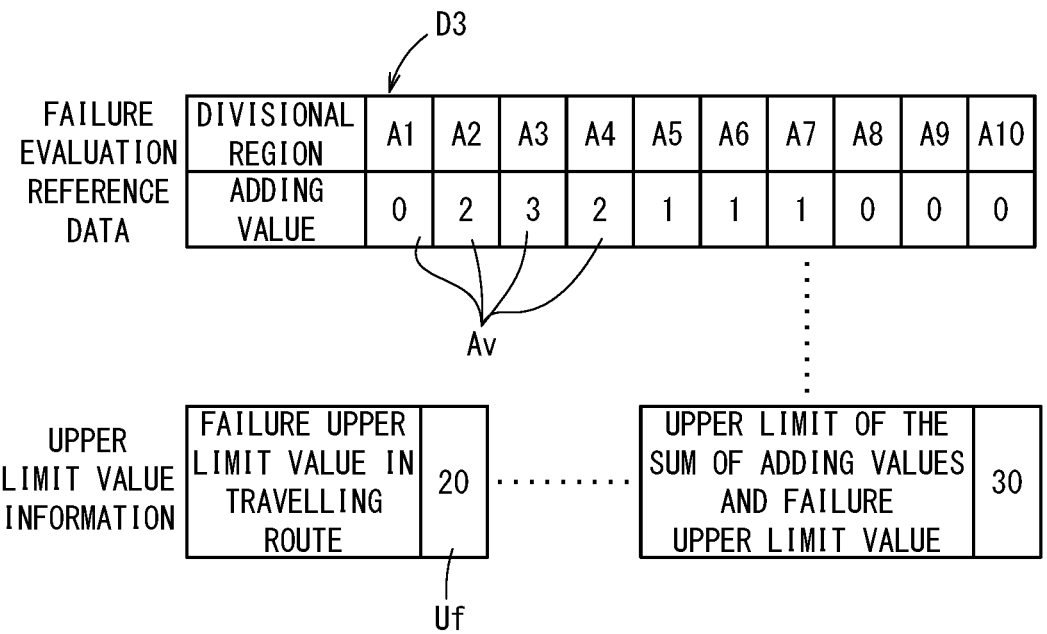

WIRE ELECTRICAL DISCHARGE MACHINE

CROSS-REFERENCE TO RELATED APPLICATION

This application is based upon and claims the benefit of priority from Japanese Patent Application No. 2016-169820 filed on Aug. 31, 2016, the contents of which are incorporated herein by reference.

BACKGROUND OF THE INVENTION

Field of the Invention

The present invention relates to a wire electrical discharge machine that performs auto wire feeding by delivering a wire electrode.

Description of the Related Art

The wire electrical discharge machines perform machining on a workpiece by discharging electricity from a wire electrode inserted through a hole or a slot of the workpiece. This type of wire electrical discharge includes an auto wire feeding mechanism, which performs auto wire feeding by cutting and collecting the wire electrode used for discharge, and feeding a fresh wire electrode through the hole or slot of the workpiece.

In performing auto wire feeding, there occur cases in which auto wire feeding fails, for example, due to the wire electrode getting caught by the components of the auto wire feeding mechanism or the workpiece. To deal with this situation, as disclosed in Japanese Laid-Open Patent Publication No. 02-160422, the wire electrical discharge machine is configured to repeatedly make an attempt to perform auto wire feeding even if auto wire feeding fails. If auto wire feeding is not completed even after a certain number of attempts, the operation of the machine is stopped and the user is reported as to check the wire electrode and wire electrode's travelling route.

SUMMARY OF THE INVENTION

Meanwhile, in the travelling route of the wire electrode in the auto wire feeding mechanism, there are sections where the wire electrode is easy to pass (low difficulty in auto wire feeding) and sections where the wire electrode is difficult to pass (high difficulty in auto wire feeding). However, conventionally, failures are counted regardless of the degree of difficulty in the travelling route of the wire electrode. Therefore, if auto wire feeding fails at a section with a low degree of difficulty and the number of failures reaches the upper limit even though auto wire feeding has passed through sections with high degrees of difficulty after multiple attempts, the machine for example stops auto wire feeding or winds back the wire electrode to the initial position. This causes a disadvantage that the success rate of wire feeding and the working efficiency of the entire machining are lowered.

The present invention has been devised in view of the above circumstances, it is therefore an object of the invention to provide a wire electrical discharge machine capable of improving the success rate of wire feeding and the working efficiency of the entire machining by determining whether auto wire feeding should be retried or not based on the position of the wire electrode at the time when auto wire feeding has failed.

In order to achieve the above object, the present invention provides a wire electrical discharge machine that feeds a wire electrode to perform auto wire feeding of the wire electrode, comprising: a transport mechanism configured to feed the wire electrode along a travelling route; a failure detector configured to be able to detect a failure of the auto wire feeding; a position detector configured to be able to detect the tip position of the wire electrode on the travelling route; a storage medium configured such that a plurality of divisional regions obtained by sectioning the travelling route are set and failure evaluation reference data of the auto wire feeding for every divisional region is stored; and a control device configured to identify the tip position of the wire electrode when a failure of the auto wire feeding occurs, based on detection signals from the failure detector and the position detector and determine whether to perform or stop retry of the auto wire feeding, based on the tip position and the failure evaluation reference data for every divisional region.

As described above, in the wire electrical discharge machine, by dividing the travelling route of the wire electrode into multiple divisional regions, it is possible to monitor the state of the auto wire feeding of the wire electrode in each individual divisional region. That is, the control device refers to the failure evaluation reference data for each of the divisional regions when the auto wire feeding fails, thereby allowing an increased count of failures, for example, by taking into consideration the difficulty for the wire electrode to pass through the region. This enables the control device to continue the auto wire feeding when the wire electrode fails to pass through a divisional region of a low difficulty level even after passage through an upstream divisional region of a high difficulty level after performing multiple attempts. As a result, the wire electrical discharge machine can improve the success rate of the wire feeding and the working efficiency of the entire process.

In this case, it is preferable that the failure evaluation reference data for every divisional region is information configured such that, of the multiple divisional regions, a divisional region causing higher difficulty for the wire electrode to pass therethrough is permitted with a greater count of failures in the auto wire feeding.

In this way, the failure evaluation reference data includes information constructed such that a divisional region causing higher difficulty for the wire electrode to pass therethrough is permitted with a greater count of failures in the auto wire feeding, it is possible for the control device to increase the number of retries of a region where the wire electrode is difficult to pass, at the time of decision. This makes the auto wire feeding easier to succeed.

It is also preferable that the control device is configured to count the number of failures in the auto wire feeding actually arising in each individual divisional region, based on the identified tip position and the divisional region obtained from the storage medium.

In this way, since the control device counts the number of failures in the auto wire feeding arising in each individual divisional region, so that it is possible to make a more reasonable decision in accordance with the count of failures.

It is also preferable that the failure evaluation reference data for every divisional region is configured to include information on the multiple divisional regions and information on the difficulty level set for every divisional region in accordance with the difficulty for the wire electrode to pass therethrough, and the control device is configured to calculate an evaluation value of the counted number of failures in each divisional region based on the difficulty level for the divisional region, compares the sum of the evaluation values for every divisional region with an upper limit value stored in the storage medium to determine whether to perform or stop retry of the auto wire feeding.

Thus, since the failure evaluation value is calculated based on the difficulty level for each divisional region, the failure evaluation value can include information on the difficulty level. Accordingly, the control device can favorably determine whether to perform or stop retry of the auto wire feeding in accordance with the difficulty level.

Further, it is preferable that the wire electrical discharge machine further includes: a setting unit configured to allow an operator to set information related to the failure evaluation reference data and store the information into the storage medium, and the setting unit includes: a failure upper limit setter configured to set the upper limit value; a divisional region setter configured to set the ranges and the number of divisions of the multiple divisional regions on the travelling route; and a difficulty level setter configured to set the difficulty level for each of the divisional regions set by the divisional region setter.

In the above way, allowing the operator to designate the upper limit value and the divisional regions with difficulty levels as information related to the failure evaluation reference data, makes it possible to reflect the states of divisional regions in a more detailed manner in accordance with the difficulty of the wire electrode 12 in passing therethrough in the actual auto wire feeding mechanism. This makes it possible to enhance the usability of the wire electrical discharge machine.

It is preferable that the control device calculates the evaluation value by, at least, dividing the count of failures by the difficulty level.

In this way, since the control device divides the count of failures by the difficulty level, it is possible to lower the evaluation value for divisional regions whose difficulty level is high. As a result, even if passage of the wire electrode has failed repeatedly in a divisional region having a high difficulty level, it is possible to continue auto wire feeding, hence increase the success rate of wiring.

Moreover, the failure evaluation reference data for every divisional region may include information on a divisional region upper limit value for every divisional region, derived based on the difficulty level thereof, and, the control device may be configured to compare the number of failures counted for every divisional region with the divisional region upper limit value for every divisional region to determine whether to perform or stop retry of the auto wire feeding.

In this way, since the failure evaluation reference data includes information on divisional region upper limit values derived from the difficulty level, it is possible to easily set the divisional region upper limit values based on operator's intuitive setting of the difficulty levels. As a result, it is possible to preferably perform the process based on the divisional region upper limit values.

Furthermore, the failure evaluation reference data for every divisional region may include information on an additional value for every divisional region, derived based on the difficulty level thereof, and the control device may be configured to calculate an cumulative upper limit value by successive addition of the additional values to the upper limit value stored in the storage medium in order of the divisional regions, compare a cumulative failure count obtained by successive addition of the counts of failures counted for every divisional region with the cumulative upper limit value to determine whether to perform or stop retry of the auto wire feeding.

In this way, since the failure evaluation reference data includes information on additional values derived based on the difficulty level, it is possible to easily set the additional values based on operator's intuitive setting of the difficulty levels. As a result, it is possible to preferably perform the process based on the additional values.

Alternatively, the failure evaluation reference data for every divisional region may include information on the multiple divisional regions and information on divisional region upper limit values each set for an individual divisional region in accordance with the difficulty for the wire electrode to pass therethrough, and the control device may be configured to compare the number of failures counted for each divisional region with the divisional region upper limit value for the individual divisional region to determine whether to perform or stop retry of the auto wire feeding.

In this way, the control device can determine whether to perform or stop retry of the auto wire feeding by comparing the number of failures counted for each divisional region with the divisional region upper limit value for the individual divisional region.

It is also preferable that the wire electrical discharge machine further includes a setting unit configured to allow an operator to set information related to the failure evaluation reference data and store the information into the storage medium, and the setting unit includes: a divisional region setter configured to set the ranges and the number of divisions of the multiple divisional regions on the travelling route; and a divisional region upper limit setter configured to set a divisional region upper limit for each of the divisional regions set by the divisional region setter.

In this way, allowing an operator to set information related to the failure evaluation reference data, i.e., the divisional regions and the upper limit values for divisional regions also makes it possible to reflect the states of divisional regions in a more detailed manner in accordance with the difficulty of the wire electrode in passing therethrough in the actual auto wire feeding mechanism.

Here, the failure evaluation reference data for every divisional region may include information on the multiple divisional regions and information on an additional value for each of divisional regions in accordance with the difficulty of the wire electrode to pass therethrough, and, the control device may be configured to calculate an cumulative upper limit value by successive addition of the additional values to an upper limit value stored in the storage medium in order of the divisional regions, compare a cumulative failure count obtained by successive addition of the counts of failures counted for every divisional region with the cumulative upper limit value to determine whether to perform or stop retry of the auto wire feeding.

In the above way, the control device can also determine whether to perform or stop retry of the auto wire feeding by comparing the cumulative number of failures counted in order of the divisional regions with the cumulative upper limit value obtained by successively adding the additional values for every divisional region to the upper limit value.

Finally, it is preferable that the wire electrical discharge machine further includes: a setting unit configured to allow an operator to set information related to the failure evaluation reference data and store the information into the storage medium, and the setting unit includes: a failure upper limit setter configured to set the upper limit value; a divisional region setter configured to set the ranges and the number of divisions of the multiple divisional regions on the travelling route; and an additional value setter configured to set an additional value for each of the divisional regions set by the divisional region setter.

In this way, allowing an operator to set information related to the failure evaluation reference data, i.e., the upper limit value, the divisional regions and the additional values also makes it possible to reflect the states of divisional regions in a more detailed manner in accordance with the difficulty of the wire electrode in passing therethrough in the actual auto wire feeding mechanism.

According to the present invention, the wire electrical discharge machine determines whether to perform or stop retry of the auto wire feeding based on the position of the wire electrode when a failure of the auto wire feeding occurs, whereby it is possible improve the success rate of the wire feeding and the work efficiency of the machining as a whole.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4A is an illustrative diagram showing an example of failure evaluation reference data according to the present embodiment;

FIG. 4B is an illustrative diagram showing one example in which the actual number of failures is counted for each divisional region;

FIG. 4C is an illustrative diagram showing failure evaluation values for individual regions and the total thereof;

FIG. 5A is an illustrative diagram showing one example of failure evaluation reference data according to the first variational example;

FIG. 5B is an illustrative diagram showing one example in which the actual number of failures is counted for each divisional region and compared with failure evaluation reference data;

FIG. 6A is an illustrative diagram showing one example of failure evaluation reference data according to the second variational example; and FIG. 6B is an illustrative diagram showing one example in which the actual counts of failures are accumulated in order of divisional regions and the accumulated count is compared with a cumulative upper limit value which is the sum of an attempt upper limit value and adding values in order of divisional regions.

DESCRIPTION OF THE PREFERRED EMBODIMENTS

The wire electrical discharge machine according to the present invention will be described in detail hereinbelow by explaining preferred embodiments with reference to the accompanying drawings.

Figure 1:
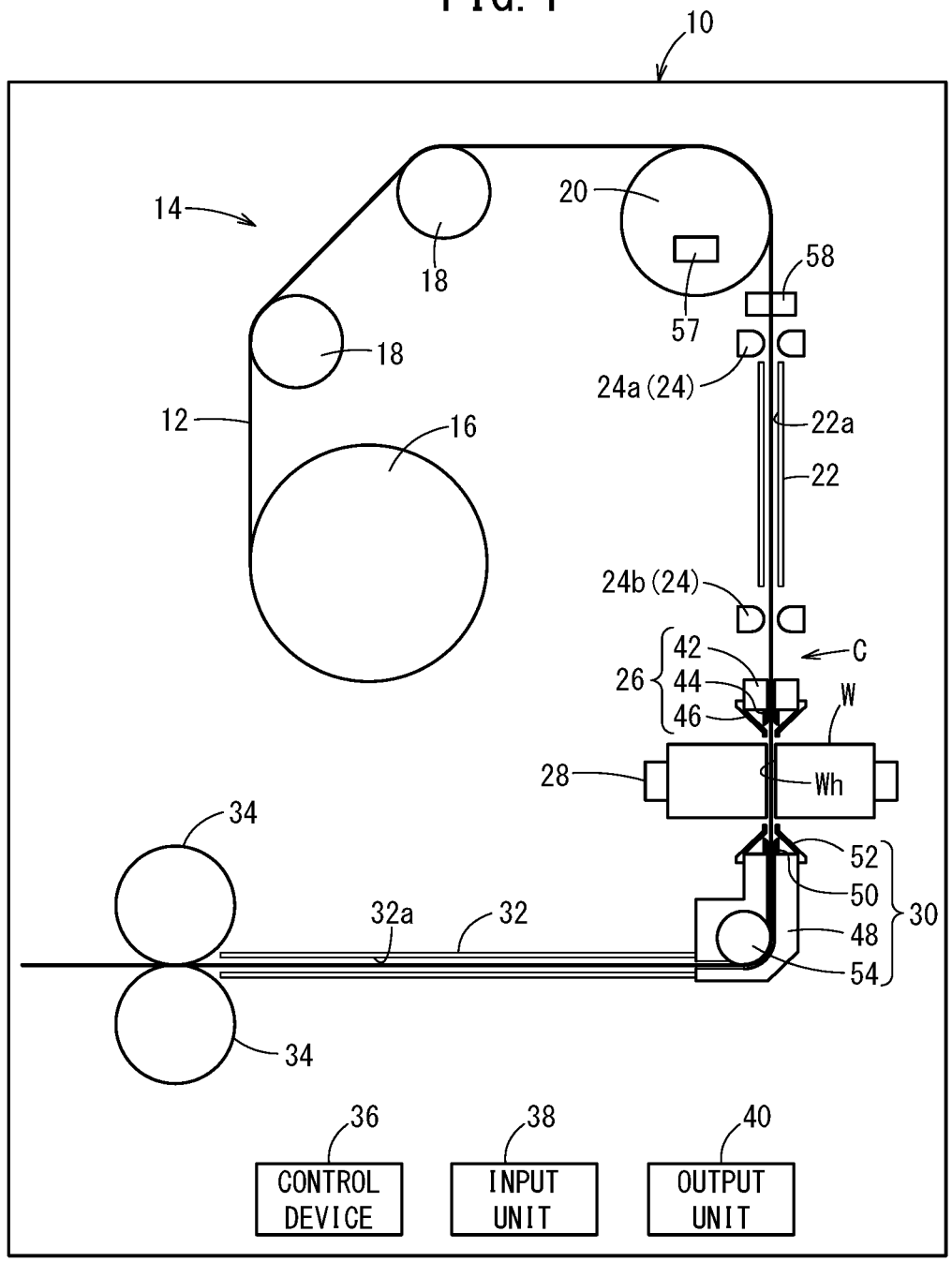
FIG. 1 is an illustrative diagram schematically showing the overall configuration of a wire electrical discharge machine according to one embodiment of the present invention.

As shown in FIG. 1, a wire electrical discharge machine 10 according to one embodiment of the present invention is a machine tool for machining a workpiece W by producing electric discharge between a wire electrode 12 and the workpiece W. The wire electrical discharge machine 10 includes a pair of machining electrodes (anode and cathode) (not shown) arranged with the workpiece W therebetween. The pair of machining electrodes perform electrical discharge machining on the workpiece W by supplying electric power for machining to the wire electrode 12 inserted into the workpiece W by wire feeding.

The wire electrical discharge machine 10 also includes an auto wire feeding mechanism 14 (feeder) for feeding the wire electrode 12 along a predetermined travelling route C. The auto wire feeding mechanism 14 performs a wire feeding operation for automatically passing the wire electrode 12 when, for example, breakage of the wire electrode 12, change of the machining site, replacement of the workpiece W or the like takes place. In the wire feeding operation, the wire electrode 12 being used is cut and the wire electrode 12 on the downstream side of the cutting is collected, and the wire electrode 12 on the upstream side is newly fed. At this time, the wire electrode 12 on the upstream side of the cutting is routed through each component of the auto wire feeding mechanism 14 and is passed through a hole Wh or the slot of the workpiece W so as to be arranged again along the travelling route C (that is, auto wire feeding is performed).

Hereinafter, the auto wire feeding mechanism 14 of the wire electrical discharge machine 10 will be described in more detail. In the present embodiment, the term "auto wire feeding" is used not only for the case where the wire electrode 12 is arranged throughout the travelling route C, but also for cases where the wire electrode 12 is passed through each of the components (divisional regions A described below) of the auto wire feeding mechanism 14 on the travelling route C.

The auto wire feeding mechanism 14 includes a wire bobbin 16, a plurality of rollers 18, a brake roller 20, an upper pipe 22, a cutting electrode 24, an upper wire guide 26, a fixing jig 28, a lower wire guide 30, a lower pipe 32, and feed rollers 34, in the order from the upstream side to the downstream side. The wire electrical discharge machine 10 further includes a control device 36 that controls the operation of the whole machine, an input unit 38 for the operator to give instructions, settings, and likes to the wire electrical discharge machine 10, and an output unit 40 that presents the machine status, operation details, errors, etc., of the wire electrical discharge machine 10 to the operator.

The wire bobbin 16 has a continuous long wire electrode 12 that is wound around the wire bobbin 16. The wire bobbin 16 is attached to a rotary drive mechanism (not shown) of the auto wire feeding mechanism 14 and supplies the wire electrode 12 to the downstream side of the travelling route C under the control of the control device 36. The wire electrode 12 used in the wire electrical discharge machine 10 is formed of, for example, metal material such as tungsten-based, copper alloy-based, and brass-based material.

The multiple rollers 18 are rotatably arranged at predetermined positions, thereby conveying the wire electrode 12 by, for example, deflecting the travelling direction of the wire electrode 12.

The brake roller 20 is rotated by an unillustrated rotary drive mechanism and sends out the wire electrode 12 downward that has been conveyed in a predetermined direction. Further, the brake roller 20 imparts tension to the wire electrode 12 (pulls up the wire electrode 12) when cutting the wire electrode 12 in cooperation with the cutting electrode 24. Further, the brake roller 20 is configured to move, not slide, the wire electrode 12. As a result, the wire electrical discharge machine 10 can accurately recognize the amount of the wire electrode 12 delivered based on the amount of rotation of the brake roller 20.

The upper pipe 22 is arranged at a position below the brake roller 20, and an insertion hole 22a for allowing the wire electrode 12 to pass therethrough is formed inside the upper pipe 22. The upper pipe 22 guides the wire electrode 12 linearly along the downward direction (the direction of gravity) by passing the wire electrode 12 through the insertion hole 22a. Further, the upper pipe 22 has a coolant supplying apparatus (not shown) at the top thereof and supplies a coolant (for example, cooling air) into the insertion hole 22a to cut the wire electrode 12 in cooperation with the cutting electrode 24.

The cutting electrode 24 includes an upper electrode 24a arranged above the upper pipe 22 and a lower electrode 24b arranged below the upper pipe 22. For example, the upper electrode 24a and lower electrode 24b are configured as grippers that are open when the wire electrode 12 is conveyed and are closed simultaneously under the control of the control device 36, thereby gripping the wire electrode 12. Then, the upper electrode 24a and lower electrode 24b hold the wire electrode 12 and electric current flows between the electrodes to heat the wire electrode 12 with Joule heat.

When the coolant supplier sends cooling air through the insertion hole 22a of the upper pipe 22 during heating, part of the wire electrode 12 on the upper side of the pipe is cooled by the cooling air, so that the temperature of part of the wire electrode 12 on the lower side of the pipe becomes higher than the temperature on the upper side. That is, the temperature of the wire electrode 12 becomes highest in the vicinity of the lower electrode 24b that is furthest from the cooling air outlet, and when the brake roller 20 pulls up the wire electrode 12 on the upstream side of the cutting point, the wire electrode 12 is always cut near the lower electrode 24b.

Figure 2:
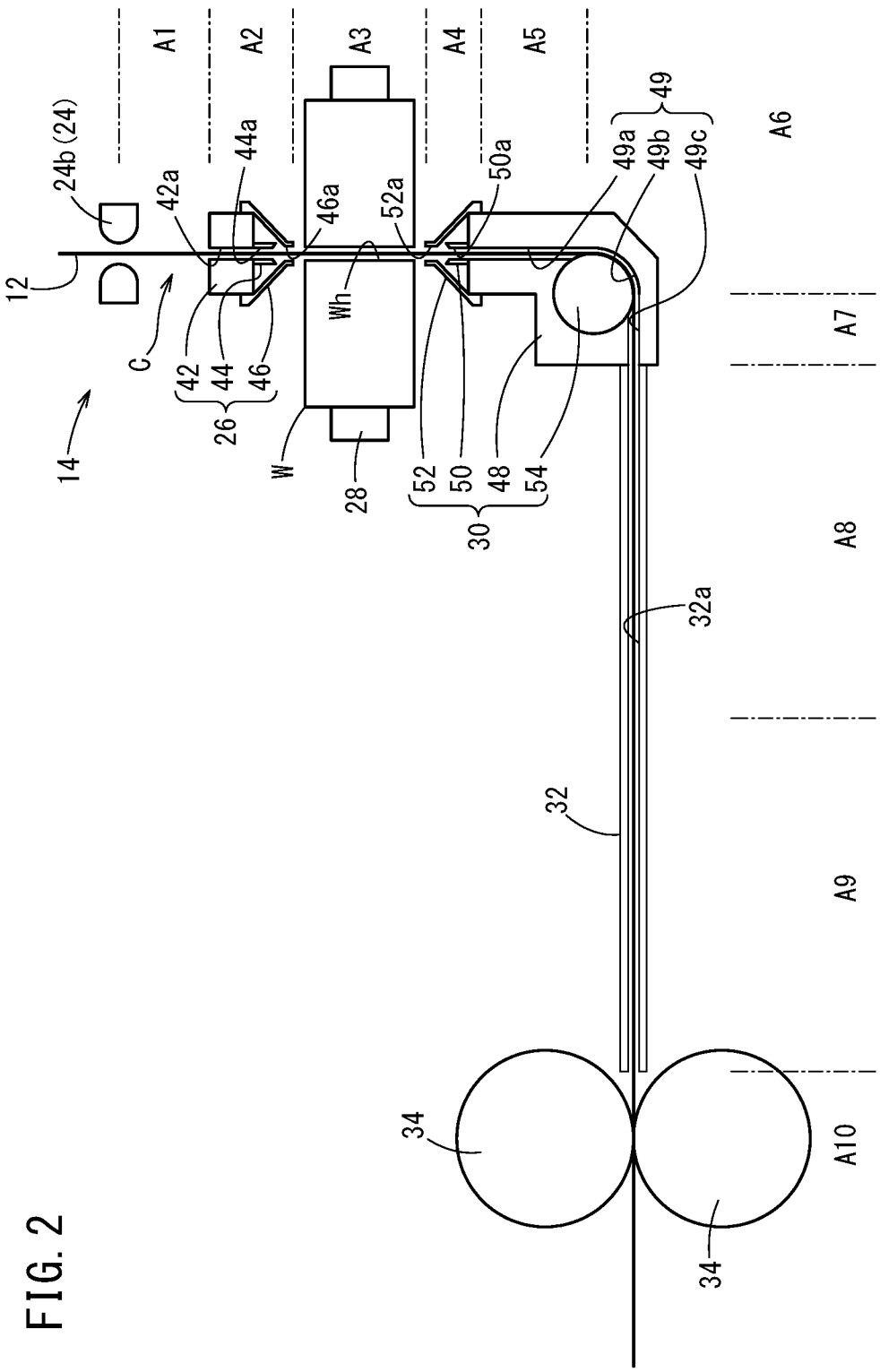
FIG. 2 is an illustrative enlarged diagram showing a travelling route of the wire electrode in an auto wire feeding mechanism in FIG. 1.

As shown in FIGS. 1 and 2, the upper wire guide 26 is arranged below the cutting electrode 24 (lower electrode 24b) and above the workpiece W, and conveys and supports the wire electrode 12, and provides a function of ejecting a working fluid to the object W. The upper wire guide 26 includes an upper guide block 42, an upper die guide 44, and an upper nozzle 46.

The upper guide block 42 has an upper block hole 42a therein and guides the wire electrode 12 going toward the workpiece W. In addition, the upper guide block 42 may have an unillustrated fluid supplier for supplying the guide fluid to the upper block hole 42a and the upper die guide 44 during the wire feeding operation of the wire electrode 12. With this guide fluid, the wire electrode 12 is urged to move linearly downwards.

The upper die guide 44 is attached to the underside of the upper guide block 42 and positions the wire electrode 12 to be fed to the workpiece W above the workpiece W. Inside the upper die guide 44, an upper die hole 44a extending in the vertical direction is formed in communication with the upper block hole 42a. The upper die hole 44a is designed to have a diameter slightly larger than the outer diameter of the wire electrode 12. Therefore, when the wire electrode 12 passes through the upper die hole 44a, the relative position of the wire electrode 12 to the workpiece W can be regulated.

The upper nozzle 46 is formed in a tapered shape that tapers off downward in a side cross-sectional view, and is attached so as to surround the upper die guide 44 below the upper guide block 42. The upper nozzle 46 has an upper nozzle hole 46a at a position below the upper die guide 44, and ejects the working fluid supplied from a working fluid supplier (not shown) to the workpiece W. The upper nozzle hole 46a is formed greater in diameter than the upper die hole 44a and sends out the wire electrode 12 and ejects the working fluid according to the timing of the supply of the working fluid supplier.

The fixing jig 28 positions and fixes the workpiece W. In the electrical discharge machining of the workpiece W, the relative position of the wire electrode 12 and the workpiece W is changed by an unillustrated displacing mechanism. For example, with the wire electrode 12 fixed, the workpiece W is moved on the XY-plane, or with the workpiece W fixed, the wire electrode 12 is moved on the XY-plane, or the wire electrode 12 is moved in a first direction in XY-plane and the workpiece W is moved in a second direction orthogonal to the first direction.

The workpiece W fixed to the fixing jig 28 may have various shapes. In performing electrical discharge machining on the workpiece W, the wire electrode 12 is placed in a hole Wh or slot formed beforehand, or led to a target place to be machined by cutting the workpiece W from its periphery. The hole Wh or slot formed beforehand is, for example, that formed in another process before electrical discharge machining, that formed by electrical discharge machining of the wire electrode 12, and the like. The material of the workpiece W is, for example, metallic material such as iron-based material and superhard material (tungsten carbide).

The lower wire guide 30 is arranged below the fixing jig 28, conveys and supports the wire electrode 12, and has a function of ejecting the working fluid to the workpiece W, similar to the upper wire guide 26. The lower wire guide 30 includes a lower guide block 48, a lower die guide 50, a lower nozzle 52, and a lower guide roller 54.

The lower guide block 48 is formed in an L shape extending in the vertical direction and the horizontal direction. Formed inside the lower guide block 48 is a lower block hole 49 which guides the wire electrode 12 having passed through the hole Wh or the slot of the workpiece W toward the feed rollers 34. The lower block hole 49 includes an upstream side lower block hole 49a extending downward from the top (one end of the L-shape) of the lower guide block 48, a curved lower block hole 49b curving from the upstream side lower block hole 49a and arranged with the lower guide roller 54, and a downstream side lower block hole 49c extending horizontally from the curved lower block hole 49b to the other end of the L shape.

The lower die guide 50 positions the wire electrode 12 having passed through the workpiece W below the workpiece W. That is, the wire electrode 12 is supported by the upper die guide 44 and the lower die guide 50. Formed inside the lower die guide 50 is a lower die hole 50a extending vertically in communication with the lower block hole 49. The lower die hole 50a is designed to have a diameter slightly greater than the outer diameter of the wire electrode 12, and when the wire electrode 12 passes therethrough, the relative position of the wire electrode 12 with respect to the workpiece W is put in place.

The lower nozzle 52 is formed in a tapered shape tapering off upward in side cross-sectional view, and is attached so as to surround the lower die guide 50 above the lower guide block 48. The lower nozzle 52 has a lower nozzle hole 52a above the lower die guide 50 and ejects the working fluid supplied from a working fluid supplier (not shown) to the workpiece W located above.

The lower guide roller 54 is rotatably arranged along the bent portion of the L-shaped lower guide block 48. The lower guide roller 54 deflects the wire electrode 12 being conveyed downward on the upstream side thereof toward the horizontal direction on the downstream side thereof.

The lower pipe 32 is connected and fixed to a side of the lower guide block 48, and formed with an insertion hole 32*a* for allowing the wire electrode 12 to pass therethrough. The lower pipe 32 connects the lower guide block 48 and the feed rollers 34 and guides the wire electrode 12 linearly in the horizontal direction.

The feed rollers 34 include a pair of upper and lower rollers arranged on the sides of the lower pipe 32. The paired feed rollers 34 grip the used wire electrode 12 to pull the wire in the advancing direction. The wire electrode 12 pulled by the feed rollers 34 is collected into a bucket (not shown). The pair of feed rollers 34 is attached to an unillustrated rotary drive mechanism of the auto wire feeding mechanism 14 and rotate under the control of the control device 36 so as to draw the wire electrode 12 at a moderate speed.

The auto wire feeding mechanism 14 further includes an encoder 57 that detects the amount of rotation and the rotational speed of the brake roller 20 and outputs a rotation signal Se (a pulse signal or the like). The control device 36 receives a rotation signal Se from the encoder 57 and feedback-controls the rotational speed of the wire bobbin 16. Further, the control device 36 causes the encoder 57 to function as a position detector at the time of determining auto wire feeding, calculating the amount of delivery of the wire electrode 12, and recognizes the position of the tip of the wire electrode 12 on the upstream side of the cutting point. The auto wire feeding mechanism 14 may include another encoder for the wire bobbin 16 in order to detect the amount of rotation and the rotational speed thereof to detect the tip position.

Further, the auto wire feeding mechanism 14 includes a deflection sensor 58 (failure detector) that detects whether or not deflection occurs in the wire electrode 12 on the upstream side of the cutting point. For example, as the deflection sensor 58, a ring-shaped contact sensor may be used. The deflection sensor 58 is arranged between the brake roller 20 and the cutting electrode 24 (the upper electrode 24*a*) with the wire electrode 12 inserted through the ring. The deflection sensor 58 outputs a deflection detection signal Sf when the wire electrode 12 is bent by being hooked on the components etc. of the auto wire feeding mechanism 14 and contacts the interior of the deflection sensor 58 at the time of the auto wire feeding operation. Thereby, the control device 36 can recognize the failure of auto wire feeding of the wire electrode 12. There are various methods for detecting the failure of auto wire feeding. For example, the deflection of the wire electrode 12 may be detected optically.

As the input unit 38 of the wire electrical discharge machine 10, there are known well-known configurations that can be operated by the worker such as physical operation buttons, a keyboard, a mouse and the like, and as the output device 40, a monitor, a speaker, indication lamps and other well-known user recognizable configurations can be mentioned. The input unit 38 and the output device 40 may be integrated like a touch panel or the like.

Figure 3:
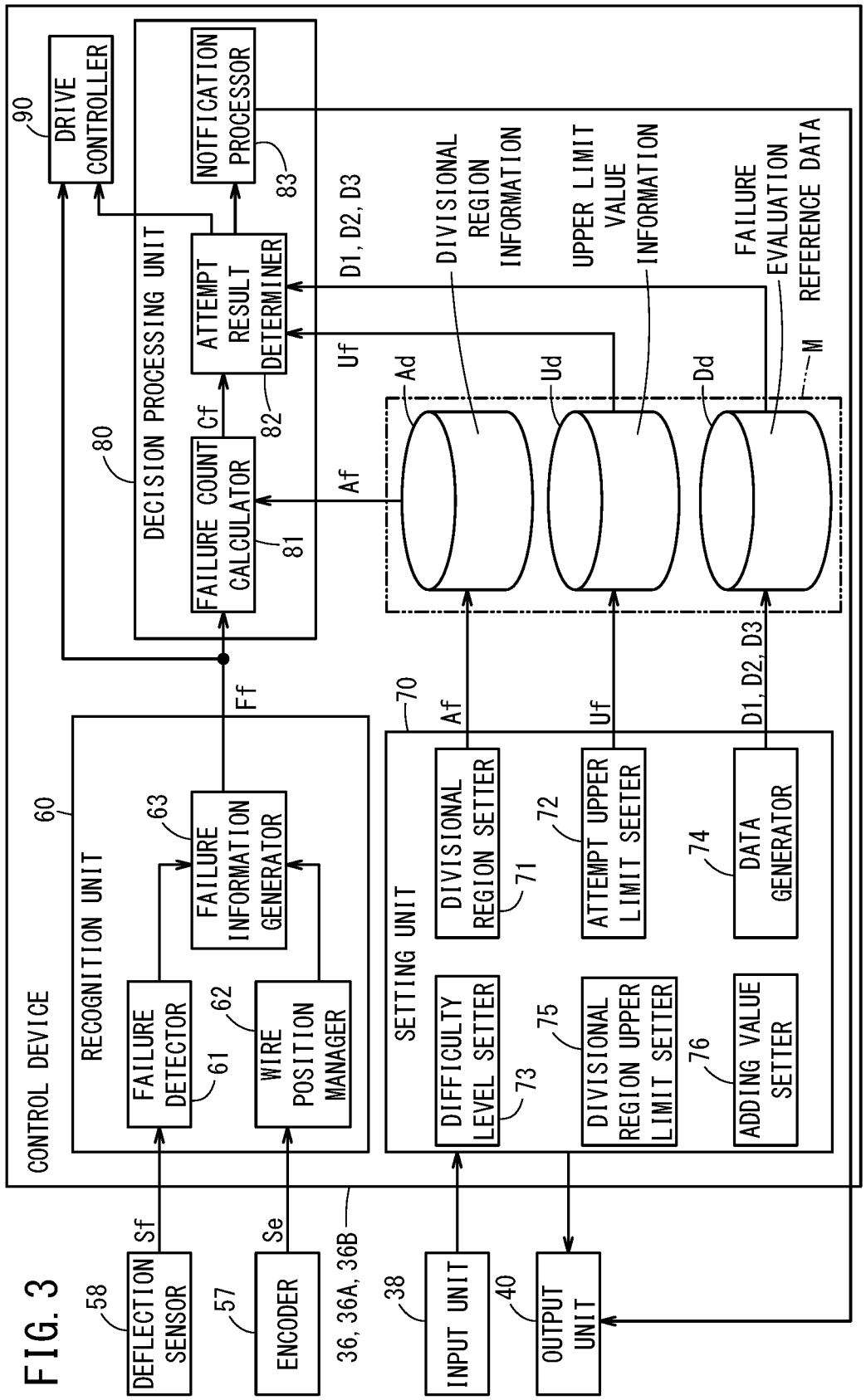
FIG. 3 is a block diagram showing functional blocks of a control device in FIG. 1.

On the other hand, the control device 36 can be a well-known computer having an input/output interface (not shown), a processor, and a memory M (storage medium: see FIG. 3). The control device 36 includes a control program (not shown) in the memory M, and the processor reads out and runs the control program to manage and control the entire operation of the wire electrical discharge machine 10. In particular, the control device 36 is programmed to try auto wire feeding multiple times even if the auto wire feeding fails.

In the wire connecting operation of the wire electrode 12, auto wire feeding will fail when the wire electrode 12 does not pass through the components of the auto wire feeding mechanism 14 and the hole Wh of the workpiece W and is caught and flexed. Upon detecting a failure in auto wire feeding, the control device 36 returns the wire electrode 12 slightly to the upstream side and feeds the wire electrode 12 again to retry auto wire feeding. Further, the control device 36 counts the number of failures of auto wire feeding and repeats the attempt at auto wire feeding until the number of failures exceeds the upper limit value.

As shown in FIG. 2, the control device 36 according to the present embodiment is configured to divide the travelling route C of the wire electrode 12 into multiple regions (divisional regions A) and monitor, for each of the divisional regions A, whether the auto wire feeding of the wire electrode 12 has succeeded or failed, when auto wire feeding is conducted. This makes it possible to recognize the failure of auto wire feeding of the wire electrode 12 for every divisional region A.

For example, the travelling route C is divided into ten divisional regions A, which, hereinbelow, are also referred to as first to tenth divisional regions A1 to A10 in order from the upstream side to the downstream side of the travelling route C. The number of divided sections of the travelling route C and the ranges of the divisional regions A may be arbitrarily designed by the operator as described later, or may be preset to be unchangeable at the time of shipment.

For example, the first divisional region A1 ranges from the cutting electrode 24 to the upper wire guide 26, the second divisional region A2 is the range where the upper wire guide 26 is installed, the third divisional region A3 ranges from the upper wire guide 26 to the lower wire guide 30 (the range where the workpiece W occupies), the fourth divisional region A4 is the range where the lower die guide 50 and the lower nozzle 52 of the lower wire guide 30 are installed, the fifth divisional region A5 is the range where the upstream side lower block hole 49*a* of the lower guide block 48 is formed, the sixth divisional region A6 is the range of the curved lower block hole 49*b* where the lower guide roller 54 in the lower guide block 48 is present, the seventh divisional region A7 is the range where the downstream side lower block hole 49*c* of the lower guide block 48 is formed, the eighth divisional region A8 is the range from the upstream end to the axial halfway point of the insertion hole 32*a* of the lower pipe 32, the ninth divisional region A9 is the range from the axial halfway point to the downstream end of the insertion hole 32*a* of the lower pipe 32, and the tenth divisional region A10 is the range where the feed roller 34 is installed.

As shown in FIG. 3, the control device 36 constructs functional blocks that evaluate the failure of the auto wire feeding for each of the first to tenth divisional regions A1 to A10 as the control program is executed by the processor. Specifically, the control device includes a recognition unit 60 that recognizes a failure of auto wire feeding, a setting unit 70 that sets failure evaluation reference data D1 and stores the failure evaluation reference data D1 in the memory M, a decision processing unit 80 that determines whether or not the whole auto wire feeding of the wire electrode 12 is normal based on the failure information from the recognition unit 60 and the failure evaluation reference data D1. The control unit 36 further includes a drive controller 90 that controls each of drive mechanisms in the auto wire feeding mechanism 14.

The recognition unit 60 detects a failure of auto wire feeding of the wire electrode 12 and detects the position of the failure. For these detection functions, the recognition unit 60 includes a failure detector 61, a wire position manager 62, and a failure information generator 63.

The failure detector 61 receives a deflection detection signal Sf from the deflection sensor 58 and detects a failure in auto wire feeding of the wire electrode 12 when, for example, the deflection detection signal Sf exceeds a predetermined threshold for a certain period of time.

The wire position manager 62 receives cutting timing of the wire electrode 12 conducted by the cutting electrode 24 and recognizes the tip of the wire electrode 12 on the upstream side of the cutting point. Then, the wire position manager continuously receives a rotation signal Se of the encoder 57 and calculates the amount of delivery of the wire electrode 12, to thereby identify the tip position of the wire electrode 12 on the travelling route C.

The failure information generator 63 receives the detection result from the failure detector 61 and the position of the tip of the wire electrode 12 from the wire position manager 62 and generates failure information Ff. The failure information Ff includes information indicating that auto wire feeding is unsuccessful and information on the tip position of the wire electrode 12. That is, the position at which the tip of the wire electrode 12 has been caught (failed) is identified. The failure information generator 63 generates the failure information Ff and outputs the information to the decision processing unit 80 and the drive controller 90. In response to reception of the failure information, the drive controller 90 stops the rotation of the wire bobbin 16 and the brake roller 20 and stops the delivery of the wire electrode 12.

The setting unit 70 is a functional unit that sets failure evaluation reference data D1 in making an attempt at auto wire feeding of the wire electrode 12. The setting unit 70 includes a divisional region setter 71, an attempt upper limit setter 72 (failure upper limit setter), a difficulty level setter 73, and a data generator 74.

The divisional region setter 71 allows the operator to set the number and the ranges of the divisional regions A along the travelling route C of the wire electrode 12. For example, the divisional region setter 71 displays an input screen for setting divisional regions A on the monitor of the output device 40, and stores the information input by the operator through the input unit 38 as the divisional region information Af into a storage area Ad of the memory M.

Similar to the divisional region setter 71, the attempt upper limit setter 72 displays an input screen or the like, allows the operator to set an upper limit value of the number of times the auto wire feeding failure occurs, and stores the upper limit value information Uf into a storage area Ud in the memory M. The "upper limit value" in the present embodiment is the limit on the total number of failures in the auto wire feeding attempted by the auto wire feeding mechanism 14. For example, 20 is set as this value. Note that the upper limit value of the number of failures may be set beforehand for each machine.

The difficulty level setter 73 allots a difficulty level of auto wire feeding to each of the first to tenth divisional regions A1 to A10 defined by the divisional region setter 71. As described above, there are places where the difficulty level of auto wire feeding is low and places where the difficulty level of auto wire feeding is high in the travelling route C. Therefore, in the present embodiment, the difficulty level is set for each of the multiple divisional regions A so as to evaluate a failure of auto wire feeding based on the difficulty of each divisional region A.

The "difficulty" is defined, for example, by 10 levels, ranging from the lowest difficulty level 1 to the highest difficulty level 10. In this embodiment, the difficulty level set by the difficulty level setter 73 is used as a divider for dividing the number of actual failures. The failure evaluation using the difficulty level will be described in detail later.

As an example, as shown in FIGS. 2 and 4A, the difficulty level of the first divisional region A1 is set at 1 because there is no component that hinders the movement of the wire electrode 12. Since, in the second divisional region A2, the wire electrode 12 has to pass through the upper wire guide 26, it is considered that the wire electrode 12 is relatively prone to be caught. Accordingly, the difficulty level of the second divisional region A2 is set at 5. Since the wire electrode 12 passes through the hole Wh of the workpiece W in the third divisional region A3, it is considered that the wire electrode 12 is most likely to be caught. Accordingly, difficulty level of this region is set at 8. Since, in the fourth divisional region A4, the wire electrode 12 passes through the lower nozzle 52 and the lower die guide 50, it is considered that the wire electrode 12 is relatively prone to be caught. Thus, the difficulty level of the fourth divisional region A4 is set at 6. Since, in the fifth divisional region A5, the wire electrode 12 passes through the upstream side lower block hole 49a of the lower guide block 48, there is some risk of the wire electrode 12 being caught. Thus, the difficulty level of the fifth divisional region A5 is set at 3. Similarly, since, in the sixth divisional region A6, the wire electrode 12 passes through the curved lower block hole 49b and in the seventh divisional region A7, passes through the downstream side lower block hole 49c, there is some risk of the wire electrode 12 being caught. Thus, the difficulty levels of the sixth and seventh divisional regions A6, A7 are set at 3. Since, in the eighth divisional region A8 and the ninth divisional region A9, the wire electrode 12 only passes through the insertion hole 32a of the lower pipe 32, it is considered that there is almost no risk of the wire electrode being caught. Thus, the difficulty levels of the eighth and ninth divisional regions A8, A9 are set at 1. Also in the tenth divisional region A10, the difficulty level is set at 1 because the feed roller 34 simply linearly pulls out the wire electrode 12 sent out from the lower pipe 32.

On the other hand, the data generator 74 creates failure evaluation reference data D1 in which each divisional region A, the upper limit value of the number of failures, and the difficulty level of each divisional region A, set by respective setters are associated with each other so as to allow the decision processing unit 80 to easily refer thereto and stores the data into a storage area Dd of the Memory M. For example, as shown in FIG. 4A the failure evaluation reference data D1 may be generated as a map in which the first to tenth divisional regions A1 to A10 are associated with difficulty levels.

The decision processing unit 80, based on the divisional region information Af, the upper limit value information Uf, and the failure evaluation reference data D1, which are stored in the memory M, and the failure information Ff transmitted from the recognition unit 60, performs a process that deals with a failure in the auto wire feeding of the wire electrode 12. The decision processing unit 80 includes a failure count calculator 81, an attempt result determiner 82 and a notification processor 83.

The failure count calculator 81, based on the divisional region information Af, identifies the divisional region A and the failure position of the tip of the wire electrode 12 included in the failure information Ff. Then, the failure count calculator 81 determines in which divisional region A a failure of the auto wire feeding has taken place, counts the number of failures in the determined divisional region A, and transmits count information Cf to the attempt result determiner 82. Further, the failure count calculator 81 stores the count result for each divisional region A in the memory M to use the count result at the time of the next transmission of the failure information Ff.

The attempt result determiner 82 determines continuation of the auto wire feeding of the wire electrode 12 based on the count information Cf from the failure count calculator 81. Specifically, using the failure evaluation reference data D1 and the count information Cf, a failure evaluation value Ev is calculated by dividing the actual count of failures in each divisional region A by the difficulty level set therefor; that is, the failure evaluation value Ev=(count information Cf)/(Difficulty level D).

Thereafter, the attempt result determiner 82 sums the failure evaluation values Ev for all the divisional regions A, and compares the total of failure evaluation values Ev with the upper limit value (upper limit value information Uf) of the failure count. If the total of failure evaluation values Ev is equal to or less than the upper limit value information Uf, it is determined that the auto wire feeding is retried. Conversely, if the total of failure evaluation values Ev exceeds the upper limit value information Uf, it is determined that the auto wire feeding is not attempted any more.

When the attempt result determiner 82 determines that the auto wire feeding is not attempted any more, the notification processor 83 generates notice content A1 to be given to the operator and causes the output device 40 and provide information (displaying information on a monitor, providing a warning from a speaker, lighting of an alarm light, etc.) as appropriate.

In addition, when the attempt result determiner 82 determines stoppage of attempt at auto wire feeding, the decision processing unit 80 notifies the drive controller 90 of the determination result and instructs the drive controller 90 to perform a process for the time of the stoppage of attempt. For example, the drive controller 90 rewinds the wire electrode 12 on the upstream side of the cutting point upon the stoppage of attempt and stops driving of each component of the auto wire feeding mechanism 14, or cuts the tip of the wire electrode 12 with the cutting electrode 24, or performs other necessary operations. In other words, "stopping an auto wire feeding attempt" is to stop the wire feeding of the wire electrode 12 which has been manipulated to pass through the travelling route C.

On the other hand, when it is determined that auto wire feeding is retried, the drive controller 90 rotates the wire bobbin 16 and the brake roller 20 again to deliver toward the downstream side the wire electrode 12 once pulled back to the upstream side due to the failure of auto wire feeding. That is, "retry of auto wire feeding" is to continue the wire feeding of the wire electrode 12 which has been manipulated to pass through the travelling route C.

The wire electrical discharge machine 10 according to the present embodiment is basically configured as described above. Now, the operation and effect will be described below.

The auto wire feeding mechanism 14 of the wire electrical discharge machine 10 executes the wire feeding under the control of the control device 36 when breakage of the wire electrode 12, change of a machining place, replacement of the workpiece W or the like takes place. In the wire feeding, the auto wire feeding mechanism 14 cuts the wire electrode 12 by the cutting electrode 24. As a result, the tip of the wire electrode 12 on the upstream side of the cutting point is positioned above and near the lower electrode 24*b*.

Next, the auto wire feeding mechanism 14 rotates the feed roller 34 to collect the wire electrode 12 on the downstream side of the cutting point. In addition, the auto wire feeding mechanism 14 rotates the wire bobbin 16 or the brake roller 20 to move the tip of the wire electrode 12 on the upstream side of the cutting point along the travelling route C on the downstream side of the cutting electrode 24. This causes the wire electrode 12 to enter the upper block hole 42*a* of the upper guide block 42, and pass through the upper die hole 44*a* of the upper die guide 44, the upper nozzle hole 46*a* of the upper nozzle 46, the hole Wh of the workpiece W, the lower nozzle hole 52*a* of the lower nozzle 52, the lower die hole 50*a* of the lower die guide 50, the lower block hole 49 of the lower guide block 48, the insertion hole 32*a* of the lower pipe 32, and the pair of feed rollers 34. During the feeding of the wire electrode 12, the wire position manager 62 of the recognition unit 60 recognizes the position of the tip of the wire electrode 12 on the travelling route C based on the rotation signal Se of the encoder 57.

When the wire electrode 12 is caught in a certain divisional region A while moving, the control device 36 detects deflection of the wire electrode 12 by the deflection sensor 58. The failure detector 61 of the control device 36 receives the deflection detection signal Sf from the deflection sensor 58 and detects failure of the auto wire feeding when the signal satisfies the requirement. Based on the detection of the failure of auto wire feeding and the tip position of the wire electrode 12 from the wire position manager 62, the failure information generator 63 generates failure information Ff and transmits the failure information Ff to the decision processing unit 80.

Upon receipt of the failure information Ff, the failure count calculator 81 of the decision processing unit 80 compares the tip position of the wire electrode 12 included in the failure information Ff with the divisional region information Af, increments the count of failures in the divisional region A where the failure has occurred, and sends the count information Cf to the attempt result determiner 82.

The attempt result determiner 82 calculates the failure evaluation value Ev based on the count information Cf and the failure evaluation reference data D1 stored in the memory M. For example, when the wire electrode 12 passed through the first divisional region A1 without any problem and 6 times of failure of auto wire feeding have been detected in the second divisional region A2, the count is divided by the difficulty level 5 of the second divisional region A2 to obtain a failure evaluation value Ev of 6/5=1.2 as shown in FIG. 4C. Similarly, when 12 times of failure of auto wire feeding have been detected in the third divisional region A3, a failure evaluation value Ev of 12/8=1.5 is obtained. When 3 times of failure of auto wire feeding have been detected in the fourth divisional region A4, a failure evaluation value Ev of 3/6=0.5 is obtained. As a result, the total of the failure evaluation values Ev up to the fourth divisional region A4 is 3.2, which comes to be sufficiently low.

Since the conventional wire electrical discharge machine has been configured to simply count the failure of auto wire feeding occurring in the travelling route C regardless of the difficulty levels of the divisional regions A, the counts of failure up to the fourth region A4 amount to 21 in total, as shown in FIG. 4B. Therefore, if the upper limit value of the number of failures is 20, in the conventional configuration, the wire electrode 12 having advanced up to the fourth divisional region A4 is rewound and the operation of the auto wire feeding mechanism 14 ends up being stopped.

In contrast, the wire electrical discharge machine 10 of the present embodiment calculates the failure evaluation value Ev taking into consideration the difficulty level for each divisional region A as described above. Then, the total of the failure evaluation values Ev is compared with the upper limit value information Uf of the wire electrode 12 to determine whether another attempt at auto wire feeding is retried or not. As a result, even if numerous attempts have been made in a divisional region A having a high degree of difficulty, the total of failure evaluation values Ev decreases, and even if auto wire feeding fails after the wire electrode 12 passes through the area with a high difficulty level, it is possible to suppress disruption of the attempt to perform the wire feeding of the wire electrode 12.

As described above, the wire electrical discharge machine 10 according to the present embodiment, by dividing the travelling route C of the wire electrode 12 into a plurality of divisional regions A, can monitor the state of auto wire feeding of the wire electrode 12 in each individual divisional region A. That is, the decision processing unit 80 refers to the failure evaluation reference data D1 for each of the divisional regions A when auto wire feeding fails, and can accept the increase of failures in a divisional region A having a higher difficulty level. This enables the auto wire feeding mechanism 14 to continue auto wire feeding even when the wire electrode fails to pass through a divisional region A having a low difficulty level after the wire electrode passes through an upstream divisional region A having a high difficulty level with multiple attempts. As a result, the wire electrical discharge machine 10 can improve the success rate of wire feeding and the working efficiency of the entire process.

In this case, the failure evaluation reference data D1 is constructed so as to allow increase in number of failures during the auto wire feeding, or in other words, raise the level of difficulty in proportion to the difficulty for the wire electrode to pass through a divisional region A, it is possible to increase the number of retries in a divisional region A having a higher difficulty level at the time of the decision made by the decision processing unit 80. In this way, the auto wire feeding succeeds more easily. Further, the decision processing unit 80 can make a more reasonable decision in accordance with the count of failures obtained by counting the number of failures in the auto wire feeding for every divisional region A at the time of the decision. Furthermore, the operator is allowed to designate, as information related to the failure evaluation reference data D1, the failure upper limit value Uf (upper limit value information) and the divisional regions A with difficulty levels, and thus it becomes possible to reflect the states of divisional regions A in a more detailed manner in accordance with the difficulty for the wire electrode 12 to pass therethrough in the actual auto wire feeding mechanism 14. Thus, it becomes possible to enhance the usability of the wire electrical discharge machine 10.

Furthermore, since the decision processing unit 80 calculates the failure evaluation value Ev based on the difficulty level for each divisional region A, the failure evaluation value Ev includes information on the difficulty level. As a result, the decision processing unit 80 is better able to determine whether to perform or stop retry of the auto wire feeding. At this time, by dividing the count of failures by the difficulty level, the decision processing unit 80 can adjust failure evaluation so that the higher the difficulty level of a divisional region A, the lower the failure evaluation value Ev in the region. As a result, even if the auto wire feeding has failed repeatedly in the divisional region A having a high difficulty level, it is possible to continue the auto wire feeding, hence increase the success rate of the wire feeding.

It should be noted that the wire electrical discharge machine 10 is not limited to the above-described configuration, and various modifications can be made. For example, the attempt result determiner 82 may simply adopt various calculation methods, instead of directly dividing the count information Cf by the difficulty level based on the failure evaluation reference data D1. As a specific example, by multiplying the failure evaluation value Ev=(count information Cf)/(difficulty level) by a predetermined constant X, it is possible to limit the effect of the divider to, at most, about half the original divider based on the difficulty level. For example, if ten levels of difficulty are assigned, multiplication of 5 as the constant X can achieve the above effect. With the above failure count example, the failure evaluation value Ev of the second divisional region A2 is 6/5×5=6, the failure evaluation value Ev of the divisional region A3 is 12/8×5=7.5, and the failure evaluation value Ev of the fourth divisional region A4 is ⅜×5=2.5, hence the failure evaluation values Ev amount to 16 in total.

In addition, use of a value less than 1 as a difficulty level makes the effective count of failures greater than the actual count of failures, whereby it is possible to make the total of failure evaluation values quickly reach the attempt upper limit value when a failure occurs at a place where no failure is normally expected. This arrangement makes it possible to shift the machine operation to a next step such as maintenance of the wire electrical discharge machine 10 and re-cutting of the wire electrode 12 at an early stage. Thus, the work efficiency of the wire electrical discharge machine 10 as a whole can be improved.

Further, the drive controller 90 of the wire electrical discharge machine 10 may adjust the movement control of the wire electrode 12 in accordance with the difficulty level of each divisional region A. For example, in a divisional region A having a high degree of difficulty, it can be expected to improve the success rate of wire feeding by performing control such as slowing the moving speed of the wire electrode 12.

Next, other variational examples of the wire electrical discharge machine 10 will be described. In the following description, the same reference numerals are given to components having the same configurations or the same functions as those of the wire electrical discharge machine 10 described above, without detailed description.

Variational Example 1

As shown in FIGS. 3 and 5A, a control device 36A according to the first variational example differs from the above-described control device 36 in that in failure evaluation reference data D2, each of divisional regions A defined along the travelling route C is associated with a divisional region upper limit value Uv, which is the upper limit of the count of failures in the auto wire feeding. Therefore, the setting unit 70 of the control device 36A includes a divisional region upper limit setter 75 capable of setting a divisional region upper limit value Uv for each divisional region A.

In this case, the divisional region upper limit setter 75 displays an input screen or the like to make the operator set a divisional region upper limit value Uv for each divisional region A, generates the failure evaluation reference data D2, and stores the data into a storage area Dd of the memory M. For example, as shown in FIG. 5A, the failure evaluation reference data D2 may be created as a map in which the first to tenth divisional regions A1 to A10 are associated with respective divisional region upper limits Uv.

Here, the divisional region upper limit value Uv can take a value corresponding to the difficulty level of the auto wire feeding for each divisional region A. Accordingly, if the difficulty level is low, the divisional region upper limit value Uv may be set small, and if the difficulty level is high, the divisional region upper limit value Uv may be set large. For example, in the failure evaluation reference data D2 shown in FIG. 5A, the divisional region upper limit value Uv of the first divisional region A1 is set at 1, the divisional region upper limit value Uv of the second divisional region A2 is set at 10, the divisional region upper limit value Uv of the third divisional region A3 is set at 15, the divisional region upper limit value Uv of the fourth divisional region A4 is set at 10, the divisional region upper limit values Uv of the fifth to seventh divisional regions A5 to A7 are set at 2, the divisional region upper limit values Uv of the eighth to tenth divisional regions A8 to A10 are set at 1.

On the other hand, the attempt result determiner 82 compares the count information Cf from the failure count calculation unit 81 with the failure evaluation reference data D2, and determines whether or not the actual count of failures in each divisional region A exceeds the divisional region upper limit value Uv for the divisional region A. If the count of failures for the divisional region A is equal to or less than the corresponding divisional region upper limit Uv, it is determined to retry the auto wire feeding. Conversely, if the count of failures exceeds the divisional region upper limit Uv for the corresponding divisional region A, the attempt result determiner determines to stop the attempt at the auto wire feeding. As shown in FIG. 5B, when the actual count of failures is smaller than the divisional region upper limit value Uv, the decision processing unit 80 keeps the failure flag unset (as 0) and when the actual count of failures exceeds the divisional region upper limit value Uv, the decision processing unit 80 sets the failure flag (at 1).

In addition, the attempt result determiner 82 applies the count of failures in each divisional region A to the divisional region A only, and will not consider the count of failures in the divisional region A after leaving that divisional region A. For example, when the actual count of failures in the second divisional region A2 is six, the attempt result determiner 82 compares that count with 10, the divisional region upper limit value Uv of the second divisional region A2, hence determines to continue the auto wire feeding since Uv=10>actual count=6. Then, in the next third divisional region A3, regardless of the divisional region upper limit values Uv of the other divisional regions A, the actual count of failures is compared with 15, the divisional region upper limit value Uv of the third divisional region A3.

As described above, the control device 36A according to the first variational example separately sets an individual divisional region upper limit value Uv in the auto wire feeding for each of divisional regions A, so that it is possible to determine whether to continue or stop the auto wire feeding, separating the areas with frequent failures and the areas with few failures. Accordingly, it is possible to favorably determine whether to perform or stop retry of the auto wire feeding, consequently improve the efficiency of the wire feeding and the success rate of the wire feeding.

Also in the control device 36A according to the first variational example, when the divisional region upper limit value Uv for an area where no failure is normally expected to occur is set at a small value, the count of failures promptly reaches the divisional region upper limit value Uv if a failure takes place. This makes it possible to shift the machine operation to a next step such as maintenance of the wire electrical discharge machine 10 and re-cutting of the wire electrode 12 at an early stage.

Alternatively, the divisional region upper limit setter 75 of the control device 36A may be configured to set up divisional region upper limit values Uv from the difficulty levels input by the operator through the difficulty level setter 73. For example, the divisional region upper limit setter 75 can be configured so as to read out the difficulty levels stored in the memory M by the difficulty level setter 73 and automatically calculate the divisional region upper limit values Uv from the distribution of the degrees of difficulty. As a result, the wire electrical discharge machine 10 can easily set the divisional region upper limit values Uv based on operator's intuitive setting of the difficulty levels, thus making it possible to facilitate execution of the process according to the first variational example.

Variational Example 2

As shown in FIGS. 3 and 6A, a control device 36B according to the second variational example differs from the above-described control devices 36 and 36A in that in failure evaluation reference data D3, each of divisional regions A defined along the travelling route C of the wire electrode 12 is associated with an additional value Av that is an additional value on the count of failures in the auto wire feeding. Therefore, the setting unit 70 of the control device 36B includes an additional value setter 76 capable of setting an additional value Av for each divisional region A.

In this case, the additional value setter 76 displays an input screen or the like to make the operator set an additional value Av on the count of failures for each divisional region A, generates the failure evaluation reference data D3, and stores the data into a storage area Dd of the memory M. For example, as shown in FIG. 6A, the failure evaluation reference data D3 may be created as a map in which the first to tenth divisional regions A1 to A10 are associated with respective additional values Av.

Here, the additional value Av is defined as a value that corresponds to the difficulty level of the auto wire feeding in each divisional region A and is added to the upper limit value information Uf (e.g., 20) on the entire travelling route C of the wire electrode 12. For example, in the failure evaluation reference data D3 shown in FIG. 6A, the additional value Av of the first divisional region A1 is set at 0, the additional value Av of the second divisional region A2 is set at 2, the additional value Av of the third divisional region A3 is set at 3, the additional value Av of the fourth region A4 is at 2, the additional values Av of the fifth to seventh divisional regions A5 to A7 are set at 1, and the additional value Av of the eighth to tenth divisional regions A8 to A10 are set at 0. Accordingly, when the added values Av of individual divisional regions A are added to the failure upper limit value Uf (upper limit value information) of the wire electrode 12, the count of failures increases correspondingly with the difficulty levels. In the illustrated example, since the total value of the additional values Av is 10 and the failure upper limit value Uf is 20, the total upper limit value of the total amounts to 30.

The attempt result determiner 82 compares the count information Cf from the failure count calculator 81 with the failure evaluation reference data D3. At this time, the attempt result determiner 82 calculates the cumulative failure count by accumulating the actual counts of failures in order, adds up the additional values A in order, and also calculates the cumulative upper limit value by adding the accumulation of additional values Av to the failure upper limit value Uf. Then, the determiner 82 determines whether or not the cumulative failure count exceeds the cumulative upper limit value, at each of the divisional regions A along which the wire electrode 12 moves. At this time, if the cumulative failure count is equal to or less than the cumulative upper limit value, the determiner 82 determines to perform retry of the auto wire feeding. Conversely, when the cumulative failure count exceeds the cumulative upper limit value, the determiner 82 determines to stop retry of the auto wire feeding.

For example, as shown in FIG. 6B the cumulative failure count at the fourth divisional region A4 is 21, which reaches the upper limit value of the count of failures in the conventional case (see also FIG. 4B). However, since the sum of the additional values Av of the first to fourth divisional regions A1 to A4, i.e., 7 is added at the time when the wire electrode has passed through the fourth divisional region A4, the cumulative upper limit value becomes 27 in the control device 36B according to this variational example. Therefore, even if the auto wire feeding fails at and after the fifth divisional region A5, the wiring work can be continued without immediately reaching the cumulative upper limit value.

As described above, the control device 36B according to the second variational example sets an individual additional value Av for each of divisional regions A, so that it is possible to continue the wire feeding even in the case where many failures has occurred in a divisional region A where the auto wire feeding is difficult. Accordingly, it is possible to favorably determine whether to perform or stop retry of the auto wire feeding, consequently improve the efficiency of the wire feeding and the success rate of the wire feeding.

Here, also in the control device 36B according to the second variational example, when setting a negative value for the additional value Av is enabled, it is possible to lower the attempt upper limit value so as to deal with occurrence of a failure at a place where no failure is normally expected. This setting makes the count of failures reach the attempt upper limit value promptly, it is hence possible to shift the machine operation to a next step such as maintenance of the wire electrical discharge machine 10 and re-cutting of the wire electrode 12 at an early stage.

Similarly to the first variational example, the additional value setter 76 of the control device 36B may also be configured to set up additional values Av from the difficulty levels input by the operator through the difficulty level setter 73. For example, the additional value setter 76 can be configured so as to read out the difficulty levels stored in the memory M by the difficulty level setter 73 and automatically calculate the additional values Av from the distribution of the degrees of difficulty. As a result, the wire electrical discharge machine 10 can easily set the additional values Av based on operator's intuitive setting of the difficulty levels, thus making it possible to facilitate execution of the process according to the second variational example.

The present invention is not limited to the above embodiments, and it goes without saying that various changes and modifications can be made therein without departing from the spirit and scope of the invention.

What is claimed is:

1. A wire electrical discharge machine that feeds a wire electrode to perform auto wire feeding of the wire electrode, comprising:
    a transport mechanism configured to feed the wire electrode along a travelling route;
    a failure detector configured to be able to detect a failure of the auto wire feeding;
    a position detector configured to be able to detect a position of a tip of the wire electrode on the travelling route;
    a storage medium configured such that a plurality of divisional regions obtained by sectioning the travelling route are set and failure evaluation reference data of the auto wire feeding for every divisional region is stored; and,
    a control device configured to identify the position of the tip of the wire electrode when a failure of the auto wire feeding occurs, based on detection signals from the failure detector and the position detector and determine whether to perform or stop retry of the auto wire feeding, based on the position of the tip and the failure evaluation reference data for every divisional region,
    wherein:
    the failure evaluation reference data for every divisional region is configured to include information on the multiple divisional regions and information on a difficulty level set for every divisional region in accordance with difficulty for the wire electrode to pass therethrough;
    the control device is configured
        to count the number of failures in the auto wire feeding actually arising in each individual divisional region, based on the identified position of the tip and the divisional region obtained from the storage medium and
        to calculate an evaluation value of the counted number of failures in each divisional region based on the difficulty level for the divisional region and compares the sum of the evaluation values for every divisional region with an upper limit value stored in the storage medium to determine whether to perform or stop retry of the auto wire feeding when the failure of the auto wire feeding is detected, and
    wherein the control device is configured to calculate the evaluation value by, at least, dividing the count of failures by the difficulty level.

2. The wire electrical discharge machine according to claim 1, wherein the failure evaluation reference data for every divisional region is information configured such that, of the multiple divisional regions, a divisional region causing higher difficulty for the wire electrode to pass therethrough is permitted with a greater count of failures in the auto wire feeding.

3. The wire electrical discharge machine according to claim 1, further comprising:
    a setting unit configured to allow an operator to set information related to the failure evaluation reference data and store the information into the storage medium;
    wherein the setting unit includes:
    a failure upper limit setter configured to set the upper limit value;
    a divisional region setter configured to set ranges and number of divisions of the multiple divisional regions on the travelling route; and, a difficulty level setter configured to set the difficulty level for each of the divisional regions set by the divisional region setter.

4. A wire electrical discharge machine that feeds a wire electrode to perform auto wire feeding of the wire electrode, comprising:
   a transport mechanism configured to feed the wire electrode along a travelling route;
   a failure detector configured to be able to detect a failure of the auto wire feeding;
   a position detector configured to be able to detect a position of a tip of the wire electrode on the travelling route;
   a storage medium configured such that a plurality of divisional regions obtained by sectioning the travelling route are set and failure evaluation reference data of the auto wire feeding for every divisional region is stored; and,
   a control device configured to identify the position of the tip of the wire electrode when a failure of the auto wire feeding occurs, based on detection signals from the failure detector and the position detector and determine whether to perform or stop retry of the auto wire feeding, based on the position of the tip and the failure evaluation reference data for every divisional region, wherein
   the failure evaluation reference data for every divisional region is configured to include information on the multiple divisional regions and information on an additional value for each of divisional regions set in accordance with difficulty of the wire electrode to pass therethrough; and,
   the control device is configured
      to count the number of failures in the auto wire feeding actually arising in each individual divisional region, based on the identified position of the tip and the divisional region obtained from the storage medium, and
      to calculate an cumulative upper limit value by successive addition of the additional values to an upper limit value stored in the storage medium in order of the divisional regions and compare a cumulative failure count obtained by successive addition of the counts of failures counted for every divisional region with the cumulative upper limit value to determine whether to perform or stop retry of the auto wire feeding when the failure of the auto wire feeding is detected.

5. The wire electrical discharge machine according to claim 4, further comprising:
   a setting unit configured to allow an operator to set information related to the failure evaluation reference data and store the information into the storage medium;
   wherein the setting unit includes:
   a failure upper limit setter configured to set the upper limit value;
   a divisional region setter configured to set ranges and number of divisions of the multiple divisional regions on the travelling route; and,
   an additional value setter configured to set an additional value for each of the divisional regions set by the divisional region setter.

6. The wire electrical discharge machine according to claim 4, wherein the failure evaluation reference data for every divisional region is information configured such that, of the multiple divisional regions, a divisional region causing higher difficulty for the wire electrode to pass therethrough is permitted with a greater count of failures in the auto wire feeding.

7. A wire electrical discharge machine that feeds a wire electrode to perform auto wire feeding of the wire electrode, comprising:
   a transport mechanism configured to feed the wire electrode along a travelling route;
   a failure detector configured to be able to detect a failure of the auto wire feeding;
   a position detector configured to be able to detect a position of a tip of the wire electrode on the travelling route;
   a storage medium configured such that a plurality of divisional regions obtained by sectioning the travelling route are set and failure evaluation reference data of the auto wire feeding for every divisional region is stored;
   a control device configured to identify the position of the tip of the wire electrode when a failure of the auto wire feeding occurs, based on detection signals from the failure detector and the position detector and determine whether to perform or stop retry of the auto wire feeding, based on the position of the tip and the failure evaluation reference data for every divisional region,
   a setting unit configured to allow an operator to set information related to the failure evaluation reference data and store the information into the storage medium;
   wherein the setting unit includes:
   a failure upper limit setter configured to set the upper limit value;
   a divisional region setter configured to set ranges and number of divisions of the multiple divisional regions on the travelling route; and,
   an additional value setter configured to set an additional value for each of the divisional regions set by the divisional region setter,
   wherein
   the failure evaluation reference data for every divisional region is configured to include information on the multiple divisional regions and information on an additional value for each of divisional regions set in accordance with difficulty of the wire electrode to pass therethrough; and,
   the control device is configured
      to count the number of failures in the auto wire feeding actually arising in each individual divisional region, based on the identified position of the tip and the divisional region obtained from the storage medium, and
      to calculate an cumulative upper limit value by successive addition of the additional values to an upper limit value stored in the storage medium in order of the divisional regions and compare a cumulative failure count obtained by successive addition of the counts of failures counted for every divisional region with the cumulative upper limit value to determine whether to perform or stop retry of the auto wire feeding when the failure of the auto wire feeding is detected.

* * * * *